(12) United States Patent
Zhang et al.

(10) Patent No.: US 12,365,343 B2
(45) Date of Patent: Jul. 22, 2025

(54) NLS USING A BOUNDED LINEAR INITIAL SEARCH SPACE AND A FIXED GRID WITH PRE-CALCULATED VARIABLES

(71) Applicant: Aptiv Technologies AG, Schaffhausen (CH)

(72) Inventors: Xin Zhang, Agoura Hills, CA (US); Stuart Rogers, Oak Park, CA (US); Zhengzheng Li, Agoura Hills, CA (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 99 days.

(21) Appl. No.: 18/360,682

(22) Filed: Jul. 27, 2023

(65) Prior Publication Data
US 2025/0033644 A1 Jan. 30, 2025

(51) Int. Cl.
*B60W 40/02* (2006.01)
*B60W 60/00* (2020.01)
*G06F 18/2453* (2023.01)

(52) U.S. Cl.
CPC .......... *B60W 40/02* (2013.01); *B60W 60/001* (2020.02); *G06F 18/2453* (2023.01); *B60W 2420/408* (2024.01)

(58) Field of Classification Search
CPC ............... B60W 40/02; B60W 60/001; B60W 2420/408; G06F 18/2453
See application file for complete search history.

(56) References Cited

U.S. PATENT DOCUMENTS

| 10,180,494 | B2 | 1/2019 | Kuehnle et al. | |
| 2016/0207533 | A1* | 7/2016 | Uechi | B60W 30/09 |
| 2017/0322295 | A1 | 11/2017 | Loesch et al. | |
| 2020/0271757 | A1 | 8/2020 | Mardani et al. | |

(Continued)

FOREIGN PATENT DOCUMENTS

| EP | 3767333 A1 | 1/2021 |
| EP | 4075161 A1 | 10/2022 |

OTHER PUBLICATIONS

Extended European Search Report regarding European Patent Application No. 23194702.9, dated Feb. 15, 2024.
(Continued)

*Primary Examiner* — Yufeng Zhang
(74) *Attorney, Agent, or Firm* — Harness, Dickey & Pierce, P.L.C.

(57) ABSTRACT

Described herein is NLS using a bounded linear initial search space and a fixed grid with pre-calculated variables. Specifically, first and second signals with unknown first and second elevation angles, respectively, are received that have been reflected by an object, with the second signal also having been reflected off the ground. A line of second angles is then established as a function of first angles, a sensor height, and a range to the object. The first angles being bound by a function of the sensor height and the range and a function of the sensor height, the range, and the maximum height. A search algorithm is then used to search for an initial elevation angle pair along the line. The initial elevation angle pair may then be fed into a refinement algorithm (e.g., non-linear least squares) to determine the elevation angles associated with the first and second signals.

19 Claims, 8 Drawing Sheets

(56) References Cited

U.S. PATENT DOCUMENTS

2021/0018592 A1\* 1/2021 Laghezza ............... G01S 13/34
2022/0326009 A1 10/2022 Yan et al.

OTHER PUBLICATIONS

Amir Laribi et al., "A New Height-Estimation Method Using FMCW Radar Doppler Beam Sharpening", 25th European Signal Processing Conference (EUSIPCO), pp. 1932-1396, Aug. 28, 2017.
Zhenrui Zhuang et al., "UAV Localization Using Staring Radar Under Multipath Interference", IEEE International Geoscience and Remote Sensing Symposium, pp. 2291-2294, Jul. 17, 2022.
Sergei Shishanov et al., "Road Object Height Estimation Using Multipath Effect in Automotive Radar Measurements", 24th International Radar Symposium (IRS), German Institute of Navigation (DGON), pp. 1-7, May 24, 2023.
Extended European Search Report regarding Application No. 23206831.2, dated Apr. 30, 2024.

\* cited by examiner

NLS USING A BOUNDED LINEAR INITIAL SEARCH SPACE AND A FIXED GRID WITH PRE-CALCULATED VARIABLES

BACKGROUND

Determining attributes of incoming signals (e.g., radar signals) without other information can be difficult. The non-linear least squares (NLS) method is often used under the deterministic unknown signal assumption. For example, the NLS method may be used to determine elevation angles of incoming signals.

Although it is very powerful, the NLS method relies on a good initial guess, which is then refined through iterations to arrive at a final determination. Good techniques have been developed for generating the initial guess; however, they are often plagued by large search spaces. Many times they fail to account for physical and environmental constraints which can dramatically reduce the search space.

Furthermore, the NLS method may be computationally expensive due to the large amount of calculations associated with various matrices. Performing multiple iterations of the NLS method in a crowded environment can tax associated systems and lead to decreased performance.

SUMMARY

This document is directed to methods of and systems for enabling NLS using a bounded linear initial search space and a fixed grid with pre-calculated variables. Some aspects described below include a method that includes receiving, via a sensor, a first signal reflected by an object, where the first signal has a first elevation angle relative to a boresight of the sensor. The method also includes receiving, via the sensor, a second signal reflected by the object and a ground plane, where the second signal has a second elevation angle relative to the boresight of the sensor. The method further includes determining a range to the object based on at least one of the first signal or the second signal and establishing a maximum height corresponding to an estimated maximum height of the object. The method also includes establishing a line of second elevation angles as a function of: first elevation angles, a sensor height, and the range, where the first elevation angles are between: a function of: the sensor height and the range and a function of: the sensor height, the range, and the maximum height. The method further includes determining an initial elevation angle pair of one of the first elevation angles and one of the second elevation angles using a search algorithm along the line. The method also includes refining, using NLS method, the initial elevation angle pair to determine the first elevation angle and the second elevation angle. The method further includes calculating a height of the object based on at least one of the first elevation angle or the second elevation angle and the sensor height. Other aspects described below include a system that is configured to perform the above method and computer-readable storage media comprising instructions that, when executed, cause at least one processor to perform the above method.

Other aspects described below include a method that includes receiving an initial elevation angle pair of an initial first elevation angle and an initial second elevation angle corresponding to respective signals that have been reflected off an object. The first elevation angle corresponding to a direct path reflection from the object and the second elevation angle corresponding to a multipath reflection from the object and a ground. The method also includes receiving a grid comprising pre-calculated variables for each of a plurality of grid points. The grid points corresponding to respective angle pairs of first elevation angles and second elevation angles. The method further includes refining the initial elevation angle pair by, for each iteration of one or more iterations: determining a closest grid point to a current elevation angle pair, where the initial elevation angle pair is the current elevation angle pair for a first iteration and performing an NLS iteration on the closest grid point using the pre-calculated variables for the closest grid point to determine a next angle pair. The next angle pair becomes the current elevation angle pair for a next iteration. The method also includes, based on the iterations, determining a final elevation angle pair. The final elevation angle pair is one of the grid points. The method further includes calculating a height of the object based on the final elevation angle pair. Other aspects described below include a system that is configured to perform the above method and computer-readable storage media comprising instructions that, when executed, cause at least one processor to perform the above method.

This Summary introduces simplified concepts for enabling NLS using a bounded linear initial search space and a fixed grid with pre-calculated variables that are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

Methods of and systems for enabling NLS using a bounded linear initial search space and a fixed grid with pre-calculated variables are described with reference to the following drawings that use some of the same numbers throughout to reference like or examples of like features and components.

DETAILED DESCRIPTION

Overview

Figure 1:
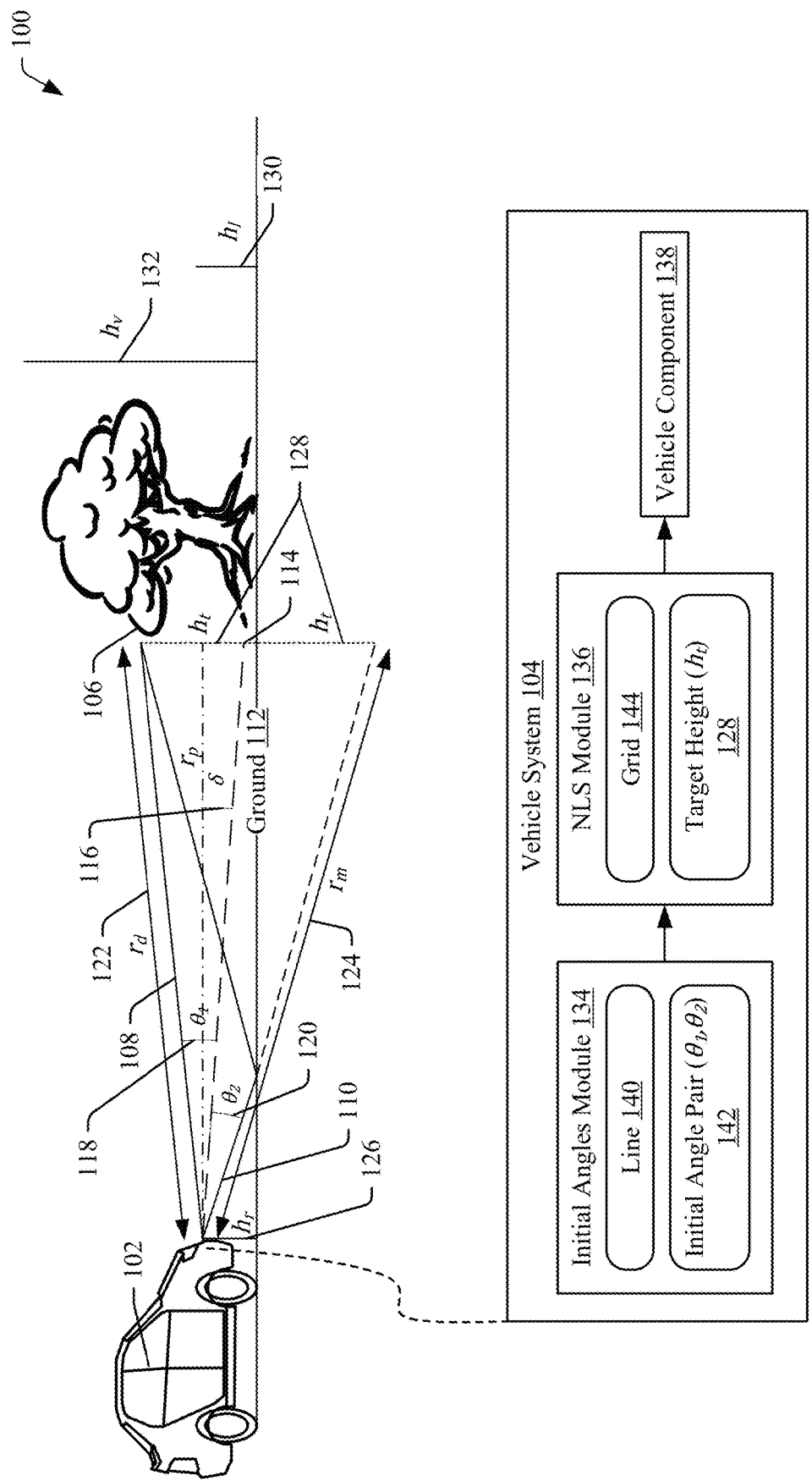
FIG. 1 illustrates, in accordance with techniques of this disclosure, an example environment where NLS using a bounded linear initial search space and a fixed grid with pre-calculated variables may be used.

The NLS method may be used to determine elevation angles of incoming signals. Although it is very powerful, the NLS method relies on a good initial guess. One key factor for determining reliable initial guesses without undue computational burden is a small search space. Otherwise, the search space may be the entire field-of-view of the sensor.

For automotive applications, the vast majority of detections have a direct path reflection and a multipath reflection off the ground. Physics dictates that the elevation angles of the reflections are related to each other. Furthermore, there is information about the environment that may be used to bound the first angles to be less than a gap between sensor limits.

Another problem with conventional NLS techniques is that their iterations are computationally expensive due to non-linear operations. Specifically, calculations of the Hessian matrix and the gradient vector can tax associated systems, especially in crowded environments.

Described herein is NLS using a bounded linear initial search space and a fixed grid with pre-calculated variables. A first part of the invention receives first and second signals with unknown first and second elevation angles, respectively, that have been reflected by an object, with the second signal also having been reflected off a ground. A line of second angles is then established as a function of first angles, a sensor height, and a range to the object. The first angles being bound by a function of the sensor height and the range and a function of the sensor height, the range, and the maximum height. A search algorithm (e.g. greedy search) is then used to search for an initial elevation angle pair along the line. The initial elevation angle pair may then be refined (e.g., using NLS iterations but not necessarily using a grid with precalculated variables as described with regard to the second part of the invention) to determine a height of the object.

A second part of the invention receives an initial elevation angle pair (not necessarily calculated using a bounded linear initial search space as described with regard to the first part of the invention) and refines it by, for one or more iterations: determining a closest grid point to a current elevation angle pair and performing an NLS iteration on the closest grid point using the pre-calculated variables for the closest grid point to determine a next elevation angle pair. When the iterations have converged a height of the object is calculated based on a final elevation angle pair.

By leveraging the physics aspects (e.g., that the second angles are functions of the associated first angles) and the environment aspects (e.g., that the first angles are bound between functions of heights and range), a small search space (e.g., a line with extents well within sensor limits) may be established. Doing so may enable avoidance of local minima and minimize required computational resources. Also, by using the fixed grid with pre-calculated variables, computational burden on associated systems may be reduced compared to conventional means by requiring less number of, and only linear, operations.

Example Environment

FIG. 1 illustrates an example environment 100 where NLS using a bounded linear initial search space and a fixed grid with pre-calculated variables may be used. The example environment 100 contains a host vehicle 102 with a vehicle system 104 and a portion of a target 106 (hereinafter referred to simply as target 106).

The host vehicle 102 may be any type of system (automobile, car, truck, motorcycle, e-bike, boat, air vehicle, and so on). The target 106 may be a portion of any moving or stationary object.

The vehicle system 104 transmits a transmission signal (not shown) and receives reflections of the transmission signal that have been reflected by objects (e.g., the target 106). For example, the vehicle system 104 receives a first signal 108 and a second signal 110 that have been reflected off the target 106. The second signal 110 has also been reflected off a ground 112. In other words, the first signal 108 is a direct path reflection while the second signal 110 is a multipath reflection.

The vehicle system 104 comprises at least one sensor (e.g., radar sensor) that detects the first signal 108 and the second signal 110. The sensor has a boresight 114 with a misalignment angle 116 ($\delta$). If the boresight 114 is angled toward the ground (as shown), the misalignment angle 116 is negative, while, if the boresight 114 is angled away from the ground, the misalignment angle 116 is positive. If there is no misalignment, the misalignment angle 116 is zero.

The first signal 108 has a first angle 118 ($\theta_1$) relative to the boresight 114. The second signal 110 has a second angle 120 ($\theta_2$) relative to the boresight 114. In the illustrated example, the second angle 120 is necessarily less than zero since it has been reflected off the ground 112 and the first angle 118 is necessarily greater than the second angle.

The first signal 108 has a first range 122 ($r_d$) and the second signal 110 has a second range 124 ($r_m$). For the purposes of this disclosure, it is assumed that the first range and the second range are similar enough to be replaced with a range (r) estimated from range-Doppler processing (e.g., they share a similar range value or bin).

The sensor has a sensor height 126 ($h_r$) relative to the ground 112. The target 106 has a target height 128 ($h_t$) relative to the ground 112. There is also a minimum height 130 ($h_l$) relative to the ground 112 that corresponds to an estimated minimum height of the target 106 and a maximum height 132 ($h_v$) relative to the ground 112 that corresponds to an estimated maximum height of the target 106. The minimum height 130 and the maximum height 132 are discussed further below.

The vehicle system 104 contains an initial angles module 134, an NLS module 136, and a vehicle component 138. The initial angles module 134 is configured to perform a search (e.g., greedy search) along a line 140 of second angles as a function of first angles to determine an initial angle pair 142 ($\theta_1, \theta_2$). The line 140 is bounded based on the minimum height 130 and the maximum height 132. The line 140 and its bounds are discussed further below.

The NLS module 136 is configured to perform NLS iterations starting with the initial angle pair 142 using an angle grid 144. The angle grid 144 has pre-calculated variables for each grid point that are used to simplify (e.g., vectorize) the NLS iterations. When the NLS iterations converge on a final angle pair, the NLS module 136 is further configured to calculate the target height 128 based on the final angle pair.

The target height 128 may then be received by the vehicle component 138 that is configured to perform a vehicle function based on the target height 128. For example, the vehicle component 138 may be an advanced driver assist system (ADAS) or autonomous driving function that provides information about the target 106 and/or controls a function of the host vehicle 102 (e.g., speed, trajectory) based on the target height 128.

Example System

Figure 2:
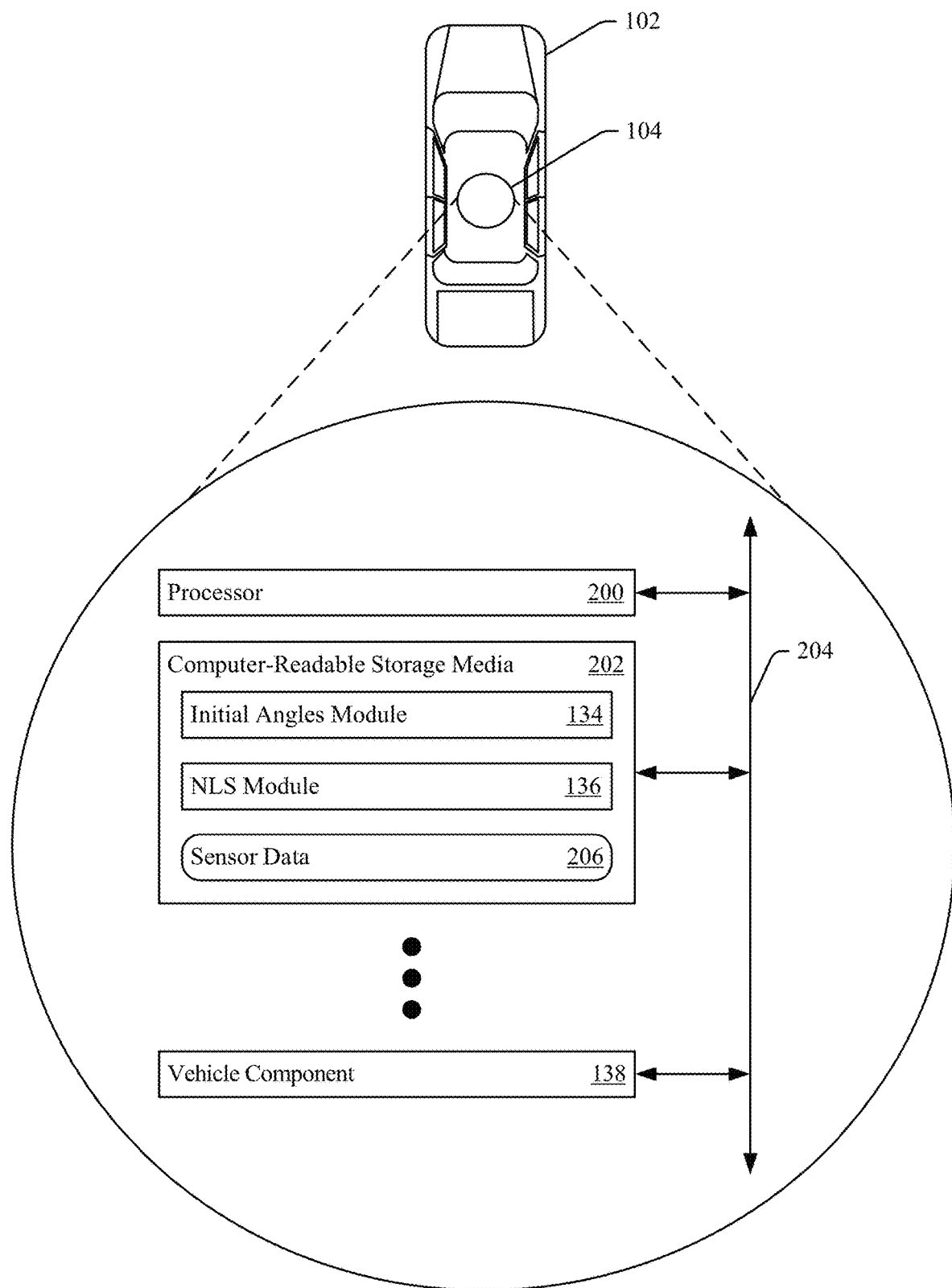
FIG. 2 illustrates, in accordance with techniques of this disclosure, an example system of a host vehicle configured to implement NLS using a bounded linear initial search space and a fixed grid with pre-calculated variables.

FIG. 2 illustrates an example of the vehicle system 104. Components of the vehicle system 104 may be arranged anywhere within or on the host vehicle 102. The vehicle system 104 may include at least one processor 200, computer-readable storage media 202 (e.g., media, medium, mediums), and the vehicle component 138. The components are operatively and/or communicatively coupled via a link 204.

The processor 200 (e.g., application processor, microprocessor, digital-signal processor (DSP), controller) is coupled to the computer-readable storage media 202 via the link 204 and executes instructions (e.g., code) stored within the computer-readable storage media 202 (e.g., non-transitory storage device such as a hard drive, solid-state drive (SSD), flash memory, read-only memory (ROM)) to implement or otherwise cause the initial angles module 134 and the NLS module 136 (or portions thereof) to perform the techniques described herein.

Although shown as being within the computer-readable storage media 202, the initial angles module 134 and the NLS module 136 (or portions thereof) may be a stand-alone components (e.g., having dedicated computer-readable storage media comprising instructions and/or executed on dedicated hardware, such as a dedicated processor, pre-programmed field-programmable-gate-array (FPGA), system on chip (SOC), and the like). The processor 200 and the computer-readable storage media 202 may be any number of components, comprise multiple components distributed throughout the host vehicle 102, located remote to the host vehicle 102, dedicated or shared with other components, modules, or systems of the host vehicle 102, and/or configured differently than illustrated without departing from the scope of this disclosure.

The computer-readable storage media 202 also contains sensor data 206 generated by one or more sensors or types of sensors (not shown) that may be local or remote to the vehicle system 104. The sensor data 206 indicates or otherwise enables the determination of information usable to perform the techniques described herein. For example, one or more of the sensors (e.g., radar) may generate sensor data 206 usable to determine attributes of the first signal 108 and the second signal 110.

The vehicle component 138 contains one or more systems or components that are communicatively coupled to the NLS module 136 and configured to use the target height 128 to perform a vehicle function. For example, the vehicle component 138 may comprise a downstream processing module or an Advanced Driver Assist System (ADAS) with means for accelerating, steering, or braking the host vehicle 102. The vehicle component 138 is communicatively coupled to the NLS module 136 via the link 204. Although shown as separate components, the initial angles module 134 and the NLS module 136 may be part of the vehicle component 138 and visa-versa.

Example Initial Angle Pair Finding

Figure 3:
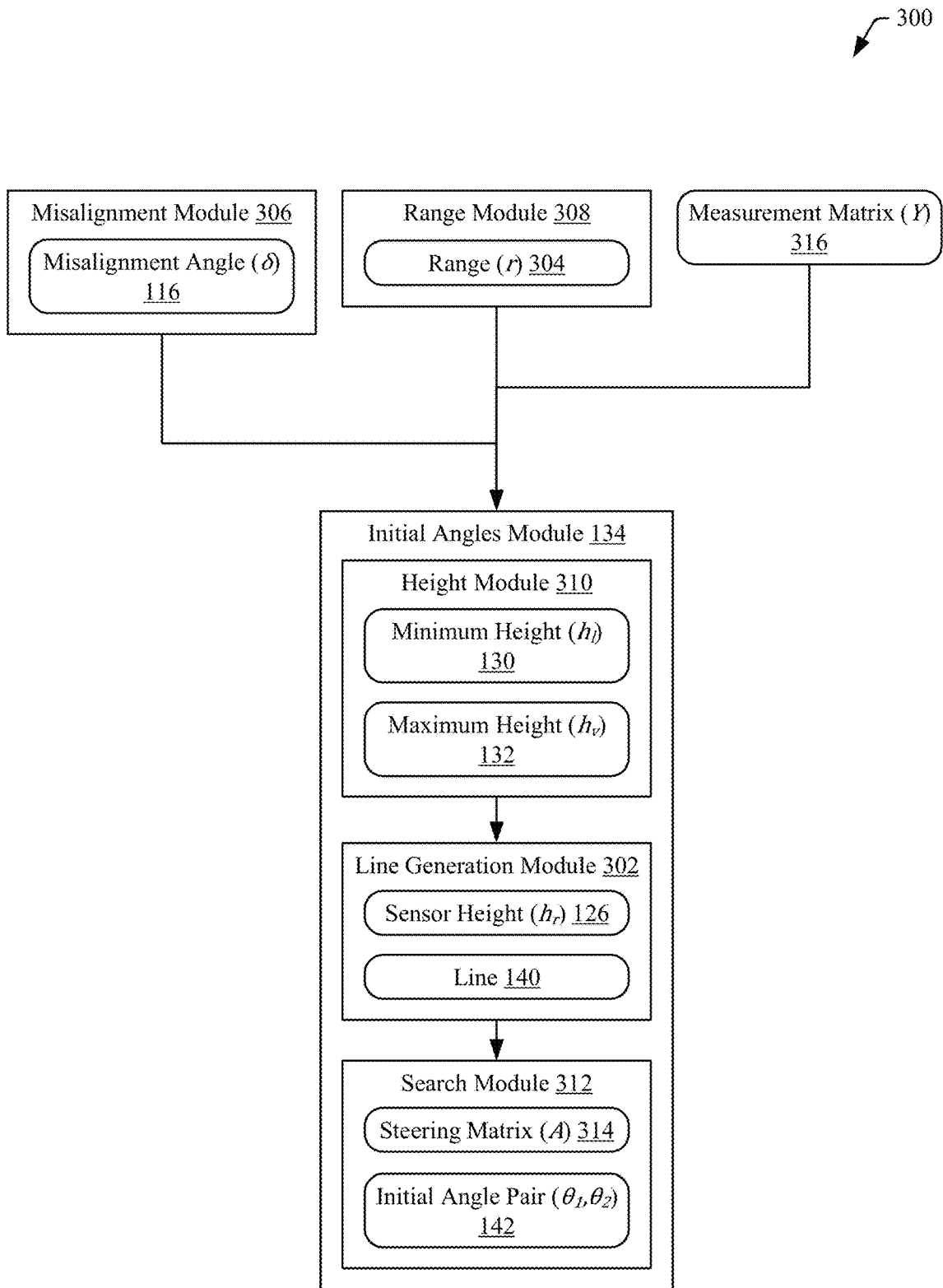
FIG. 3 illustrates, in accordance with techniques of this disclosure, an example flow of NLS using a bounded linear initial search space.

FIG. 3 illustrates, at 300, an example flow of determining the initial angle pair 142. The modules described below may be combined, separated, or rearranged without departing from the scope of this disclosure. A line generation module 302 of the initial angles module 134 receives the misalignment angle 116, a range 304(r) to the target 106, the minimum height 130, and the maximum height 132 and forms the line 140 using the above variables and the sensor height 126 (which is fixed). The misalignment angle 116 may come from a misalignment module 306 and may be determined using any techniques known by those of ordinary skill in the art.

The range 304 may come from a range module 308 that determines the range 304 to the target 106 based on range-Doppler processing. It is assumed that the first range 122 and the second range 124 are close enough to each other that they register in a similar range bin. Thus, the first range 122 equals the second range 124 equals the range 304.

The minimum height 130 and the maximum height 132 may come from a height module 310 (e.g., if they are not fixed). The minimum height 130 and the maximum height 132 may be functions of the range 304, whether the target 106 is moving or stationary, the range 304 and an azimuth angle of the target 106, and/or whether the target 106 can be identified in a target list.

As an example for a function of the range 304, the maximum height 132 may be higher for a further target than for a closer one. As an example for a function of whether the target is moving or stationary, the maximum height may be set to a maximum vehicle height if the target is moving. As an example for a function of range 304 and azimuth, a coordinate of the target 106 and whether it lies on a current road may be determined. A maximum height may be smaller for targets on the road than for targets off the road.

As an example for a function of whether the target 106 can be identified in a target list, attributes of the first signal 108 and/or the second signal 110 may be compared to attributes or properties of targets in a tracked target list that is maintained by a fusion tracking system (e.g., fusing camera, radar, lidar, etc. data). Responsive to matching one or more of the attributes or properties (e.g., range, range rate, signal-to-noise ratio, azimuth angle), the object data associated with the tracked target in the tracked target list may be used to determine the minimum height 130 and/or the maximum height 132. For example, if a specific target being tracked is a car and the attributes of the first signal 108 and/or the second signal 110 match attributes stored along with the car entry, then the minimum height 130 and/or the maximum height 132 may be set based on typical values for a car.

Regardless of how the minimum height 130 and the maximum height 132 are determined, they are used along with the misalignment angle 116, the range 304, and the sensor height 126 to form the line 140 of second angles as a function of first angles according to Equation 1, which is based on the physics relationship between the elevation angles.

$$\theta_2 = -\sin^{-1}\left(\sin(\theta_1 + \delta) + \frac{2h_r}{r}\right) - \delta \tag{1}$$

where the line 140 is bounded by $$\sin^{-1}\frac{h_l - h_r}{r} - \delta < \theta_1 < \sin^{-1}\frac{h_v - h_r}{r} - \delta$$

(e.g., based on environmental aspects).

It may be noticed that, especially for long ranges, the bounds of the search space are considerably reduced compared to sensor limits. Further, misalignment is considered, which is often neglected in traditional techniques.

Equation 1 is a general case. If misalignment and the minimum height are not considered Equation 1 becomes Equation 2.

$$\theta_2 = -\sin^{-1}\left(\sin(\theta_1) + \frac{2h_r}{r}\right) \tag{2}$$

-continued where $\sin^{-1}\frac{-h_r}{r} < \theta_1 < \sin^{-1}\frac{h_v - h_r}{r}$.

The line 140 is received by a search module 312 of the initial angles module 134 that performs a search along the line 140 to determine the initial angle pair 142. To do so, the search module 312 may utilize a steering matrix 314 (A) and a measurement matrix 316 (Y) (e.g., received from the sensor) and solves Equation 3 using the search algorithm (e.g., a greedy search).

$$\arg\min_{\theta \in \Theta} f(\theta) = \|P_A^\perp(\theta)Y\|_F^2 \qquad (3)$$

where $$P_A^\perp(\theta) = I - A(\theta)[A(\theta)^H A(\theta)]^{-1} A(\theta)^H$$

(projects the measurement matrix 316 onto an orthogonal complement of a column space of the steering matrix 314), H denotes conjugate transpose, $^{-1}$ denotes inverse, and $\|\ \|_F$ denotes Frobenius norm.

Although the greedy search has been used in the above, other search algorithms may be used without departing from the scope of this disclosure. Most, if not all, search algorithms will benefit from the reduced search space using the techniques described above.

The solution to Equation 3 is the initial angle pair 142. Because the line 140 is bounded by functions based on the minimum height 130 and the maximum height 132, the search space is considerably reduced compared with traditional techniques. Not only does that cause less likelihood of the search algorithm getting trapped by local minima, but it also makes determining the initial angle pair 142 quicker and less computationally burdensome.

Figure 4:
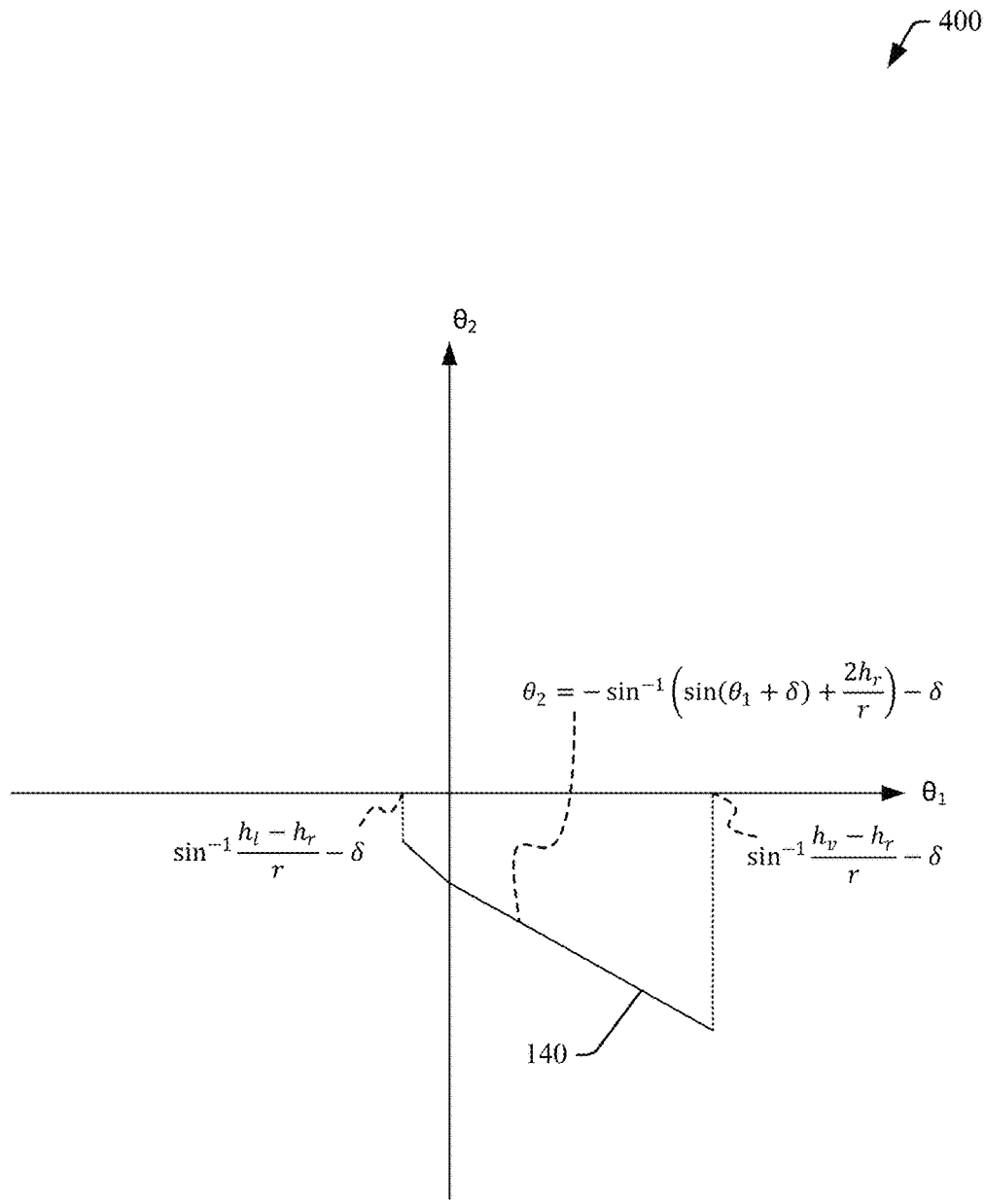
FIG. 4 illustrates, in accordance with techniques of this disclosure, an example of a bounded linear initial search space.

FIG. 4 illustrates, at 400, the line 140. As illustrated, the line 140 is based on Equation 1. Again, physics aspects dictate that the second angle 120 is a function of the first angle 118, the misalignment angle 116, the sensor height 126, and the range 304 (e.g., $$-\sin^{-1}\left(\sin(\theta_1 + \delta) + \frac{2h_r}{r}\right) - \delta).$$

Environmental aspects dictate that the first angle 118 is greater than a function of the minimum height 130, the sensor height 126, the range 304, and the misalignment angle 116

$$\left(\text{e.g., } \sin^{-1}\frac{h_l - h_r}{r} - \delta\right).$$

Environmental aspects also dictate that the first angle 118 is less than a function of the maximum height 132, the sensor height 126, the range 304, and the misalignment angle 116

$$\left(\text{e.g., } \sin^{-1}\frac{h_v - h_r}{r} - \delta\right).$$

Accordingly, the search space accounts for misalignment while being shrunk considerably from sensor fields-of-view, especially at long ranges.

Example Target Height Determination

Figure 5:
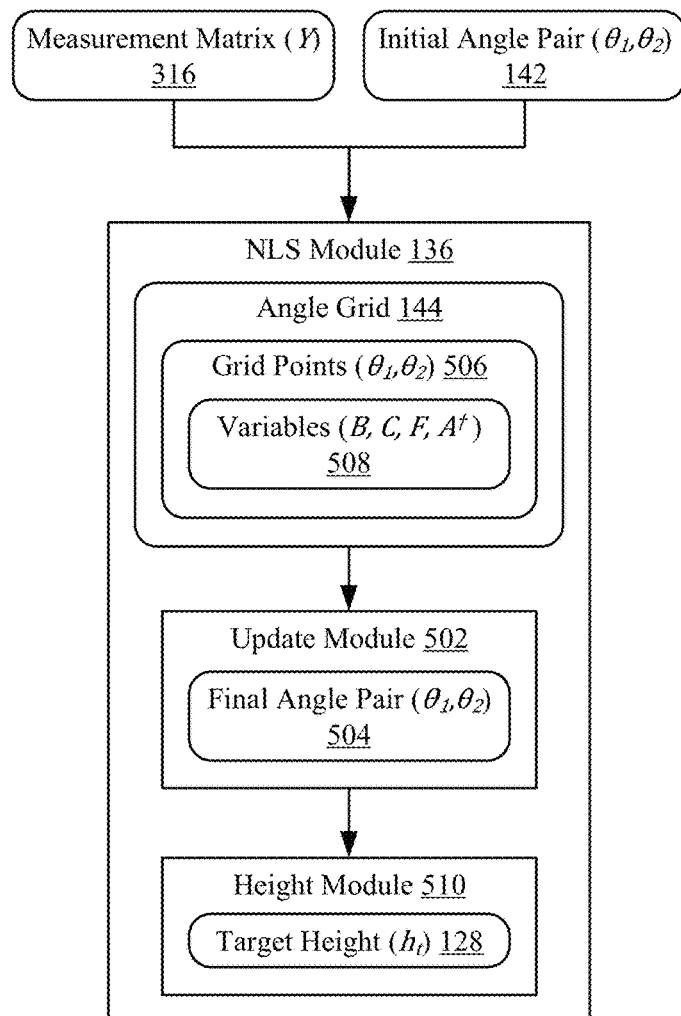
FIG. 5 illustrates, in accordance with techniques of this disclosure, an example flow of NLS using a fixed grid with pre-calculated variables.

FIG. 5 illustrates, at 500, an example flow of determining the target height 128. The modules described below may be combined, separated, or rearranged without departing from the scope of this disclosure. An update module 502 of the NLS module 136 receives the measurement matrix 316, the initial angle pair 142, and the angle grid 144 and determines a final angle pair 504 using NLS iterations. It should be noted that the initial angle pair 142 is not necessarily determined using the previous techniques. Any known techniques of determining/finding an initial angle pair may be used without departing from the scope of this disclosure.

The angle grid 144 contains a plurality of grid points 506 with respective variables 508 (B, C, F, A$^\dagger$). The grid points 506 may be pre-defined pairs of angles within a field of view of the sensor (e.g., possible pairs of the first angle 118 and the second angle 120) or may be placed based on some prior information (e.g., sensor height 126, minimum height 130, maximum height 132, range 304). Each of the grid points 506 contains a set of variables 508 that have been calculated for that grid point. The variables 508 are defined according to Equations 4.

$$B = D^H P_A^\perp \qquad (4)$$
$$C = (A^H A)^{-1}$$
$$F = D^H P_A^\perp D$$
$$A^\dagger = (A^H A)^{-1} A^H$$

where D is the first derivative matrix of A and A$^\dagger$ is a pseudoinverse of A.

In some implementations, some of the variables 508 may be pre-calculated and stored in the angle grid 144 and some of the variables 508 may be calculated in real-time. For example, F=BB$^H$. Thus, variable B may be stored in the angle grid 144 and variable F may be calculated in real-time. In other words, any number of variables 508 may be stored for each grid point 506.

The update module 502 performs NLS iterations starting with the initial angle pair 142 and using the variables 508. To do so, the update module 502 determines a closest grid point 506 to a current angle pair (e.g., the initial angle pair 142 for the first iteration), receives the variables 508 associated with the grid point 506, and calculates a Hessian matrix (H) and a gradient vector (g) according to Equations 5 and 6, respectively.

$$H = 2\Re\{(BYY^H B^H)^T \odot C + F \odot (A^\dagger YY^H (A^\dagger)^H)^T\} \qquad (5)$$
$$g = -2\Re\{\text{diag}(A^\dagger YY^H B^H)\} \qquad (6)$$

where $\Re\{\cdot\}$ returns the real part of a complex matrix and $\odot$ stands for Hadamard product.

It should be noted that, by using the variables 508, the operations of calculating the Hessian matrix and the gradient vector for each iteration are all linear (e.g., it is vectorized). This makes the computation of the Hessian matrix and the gradient vector much more simplified compared to traditional means. Accordingly, computational resources may be preserved.

Using the Hessian matrix, the gradient vector, and the current angle pair (e.g., the initial angle pair 142 for the first iteration), the update module 502 then determines the next angle pair according to either a line search (according to Equation 7) or a trust region function (according to Equation 8) and the process repeats until convergence.

$$\theta^{(l+1)} = \theta^{(l)} - \mu H^{-1} g \qquad (7)$$

$$\theta^{(l+1)} = \theta^{(l)} - (H + \mu * \text{diag}(H))^{-1} g \qquad (8)$$

where $\theta^{(l)}$ is the current angle pair, $\mu H^{-1}$ g and $(H+\mu*\text{diag}(H))^{-1}$ g correspond to offsets or distances to the next angle pair, and u is a damping factor that is a non-negative scalar and determines a size of the trust region (also known as Levenberg-Marquardt algorithm).

Once the iterations have converged, the most-recent grid point 506 becomes the final angle pair 504. Any number of ways may be used to determine convergence. For example, if the next angle pair is closest to the current angle pair, convergence may be assumed. (e.g., the closest grid point is the previous closest grid point).

The final angle pair 504 is then received by a height module 510 that calculates the target height 128 based on the final angle pair 504. For example, the height module 510 may use one of Equations 9 or 10 to calculate the target height 128.

$$h_t = r_d \sin(\theta_1 + \delta) + h_r \qquad (9)$$

$$h_t = r_m \sin(-\theta_2 - \delta) - h_r \qquad (10)$$

Figure 6:
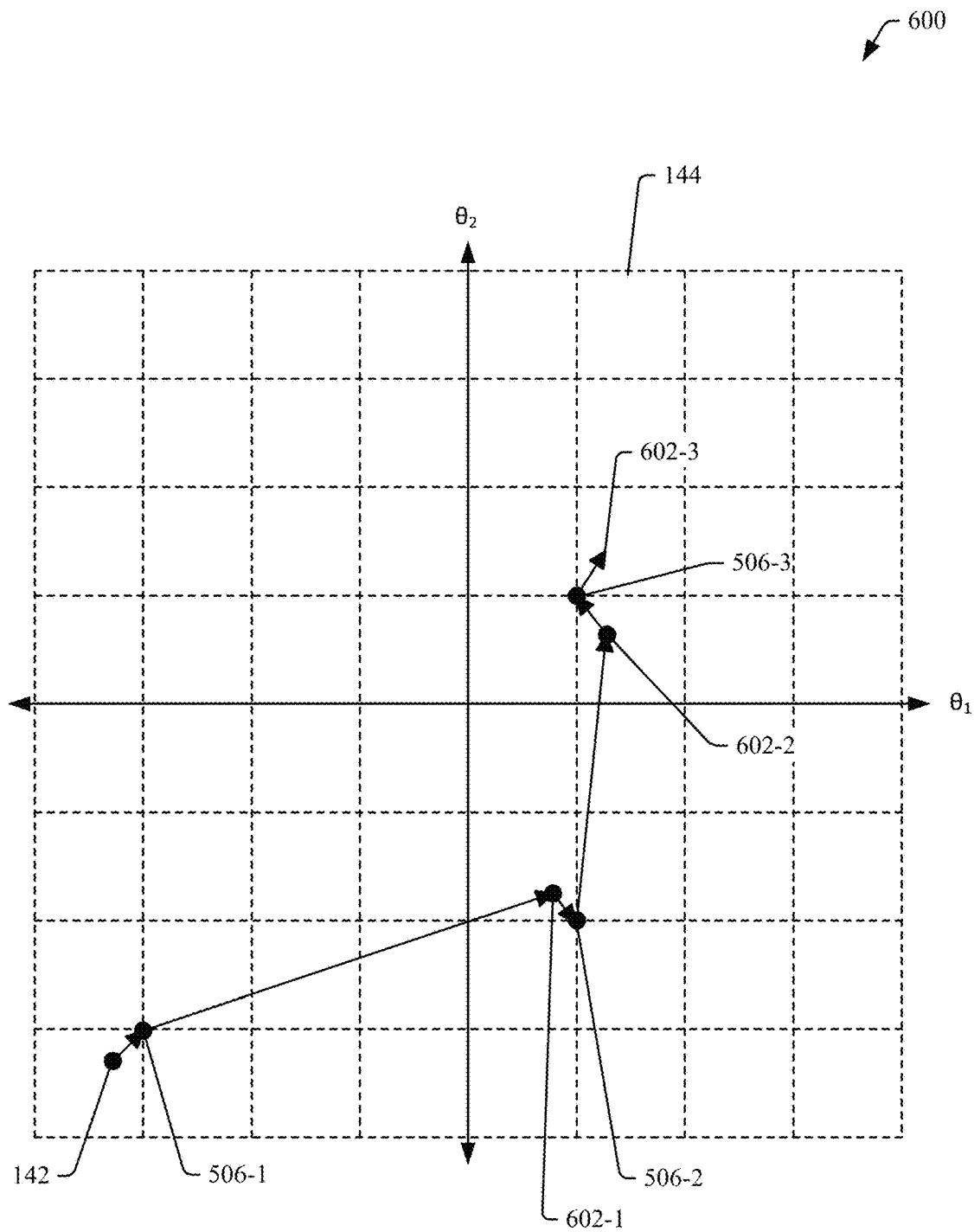
FIG. 6 illustrates, in accordance with techniques of this disclosure, an example diagram of NLS using a fixed grid with pre-calculated variables.

FIG. 6 illustrates, at 600, an example of NLS iterations using the angle grid 144 with the variables 508. The iterations start with the initial angle pair 142. A grid point 506 that is closest to the initial angle pair 142 is determined (e.g., 506-1) and the variables 508 for grid point 506-1 are used to calculate the Hessian matrix and the gradient vector. The Hessian matrix and the gradient vector are then used to determine a next angle pair from the initial angle pair 142 (e.g., angle pair 602-1). The process determines a closest grid point 506 to the angle pair 602-1 (e.g., 506-2). The variables 508 for the grid point 506-2 are used to calculate the Hessian matrix and the gradient vector. The Hessian matrix and the gradient vector are then used to determine the next angle pair from the current angle pair (e.g., angle pair 602-2). The process determines a closest grid point 506 to the angle pair 602-2 (e.g., 506-3). The process then determines the next angle pair from the previous angle pair by calculating the Hessian matrix and the gradient vector using the variables for grid point 506-3. In the illustrated example, the next angle pair is 602-3.

Because the closest grid point 506 to the angle pair 602-3 is 506-3, the process may determine that convergence has occurred. Accordingly, grid point 506-3 becomes the final angle pair 504. Other techniques may be used to determine convergence without departing from the scope of this disclosure. In some implementations, the angle pair 602-3 may be considered the final angle pair 504.

Example Methods

Figure 7:
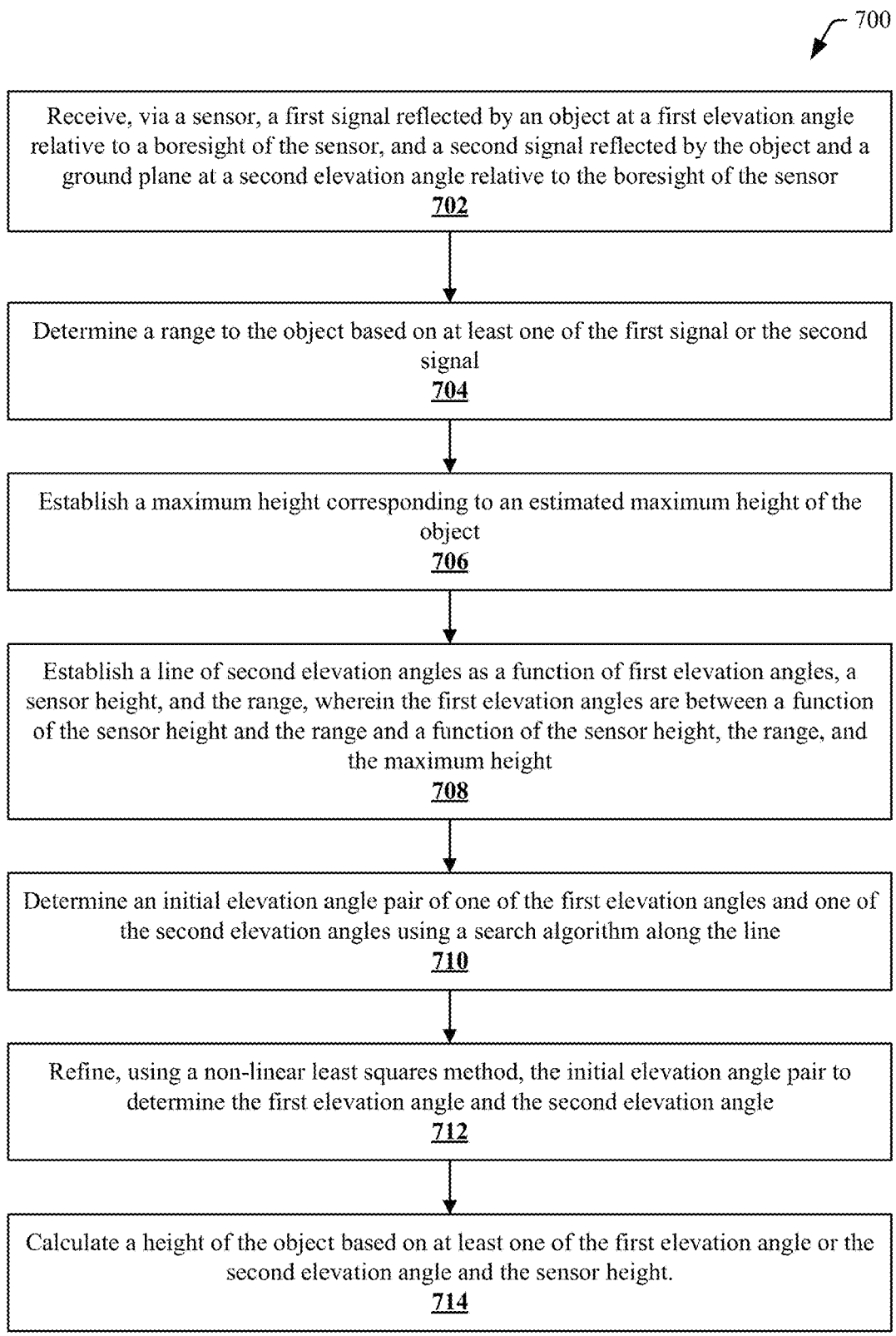
FIG. 7 illustrates, in accordance with techniques of this disclosure, an example method of NLS using a bounded linear initial search space.

FIG. 7 is an example method 700 of NLS using a bounded linear initial search space. The example method 700 may be implemented in any of the previously described environments, by any of the previously described systems or components, and by utilizing any of the previously described data flows, process flows, or techniques. The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At 702, a first signal reflected by an object is received at a first elevation angle relative to a boresight of a sensor, and a second signal reflected by the object and a ground plane is received at a second elevation angle relative to the boresight of the sensor. For example, the initial angles module 134 may receive the measurement matrix 316 corresponding to the first signal 108 and the second signal 110.

At 704, a range to the object is determined based on at least one of the first signal or the second signal. For example, the range module 308 may calculate the range 304 through range-Doppler processing of the first signal 108 and/or the second signal 110.

At 706, a maximum height corresponding to an estimated maximum height of the object is established. For example, the height module 310 may establish the maximum height 132.

At 708, a line of second elevation angles as a function of first elevation angles, a sensor height, and the range is established. The first elevation angles being between a function of the sensor height and the range and a function of the sensor height, the range, and the maximum height. For example, the line generation module 302 may establish the line 140 (e.g., according to Equation 2) based on the sensor height 126 and the range 304. The first elevation angles may be between a function of the sensor height 126 and the range 304

$$\left(\text{e.g., } \sin^{-1} \frac{h_l - h_r}{r} - \delta\right)$$

and a function of the sensor height 126, the range 304, and the maximum height 132

$$\left(\text{e.g., } \sin^{-1} \frac{h_v - h_r}{r} - \delta\right).$$

At 710, an initial elevation angle pair of one of the first elevation angles and one of the second elevation angles is determined using a search algorithm along the line. For example, the search module 312 may use a greedy search algorithm along the line 140 (e.g., via Equation 3) to determine the initial angle pair 142.

At 712, the initial elevation angle pair is refined using an NLS method to determine the first elevation angle and the second elevation angle. For example, the NLS module 136 may apply an NLS method to determine a final elevation angle pair. The NLS method may or may not use the angle grid 144 with precalculated variables. In other words, a traditional NLS method may be applied to determine the final elevation angle pair (e.g., final angle pair 504).

At 714, a height of the object is calculated based on at least one of the first elevation angle or the second elevation angle and the sensor height. For example, the height module 510 may calculate the target height 128 using Equation 9 or 10.

Figure 8:
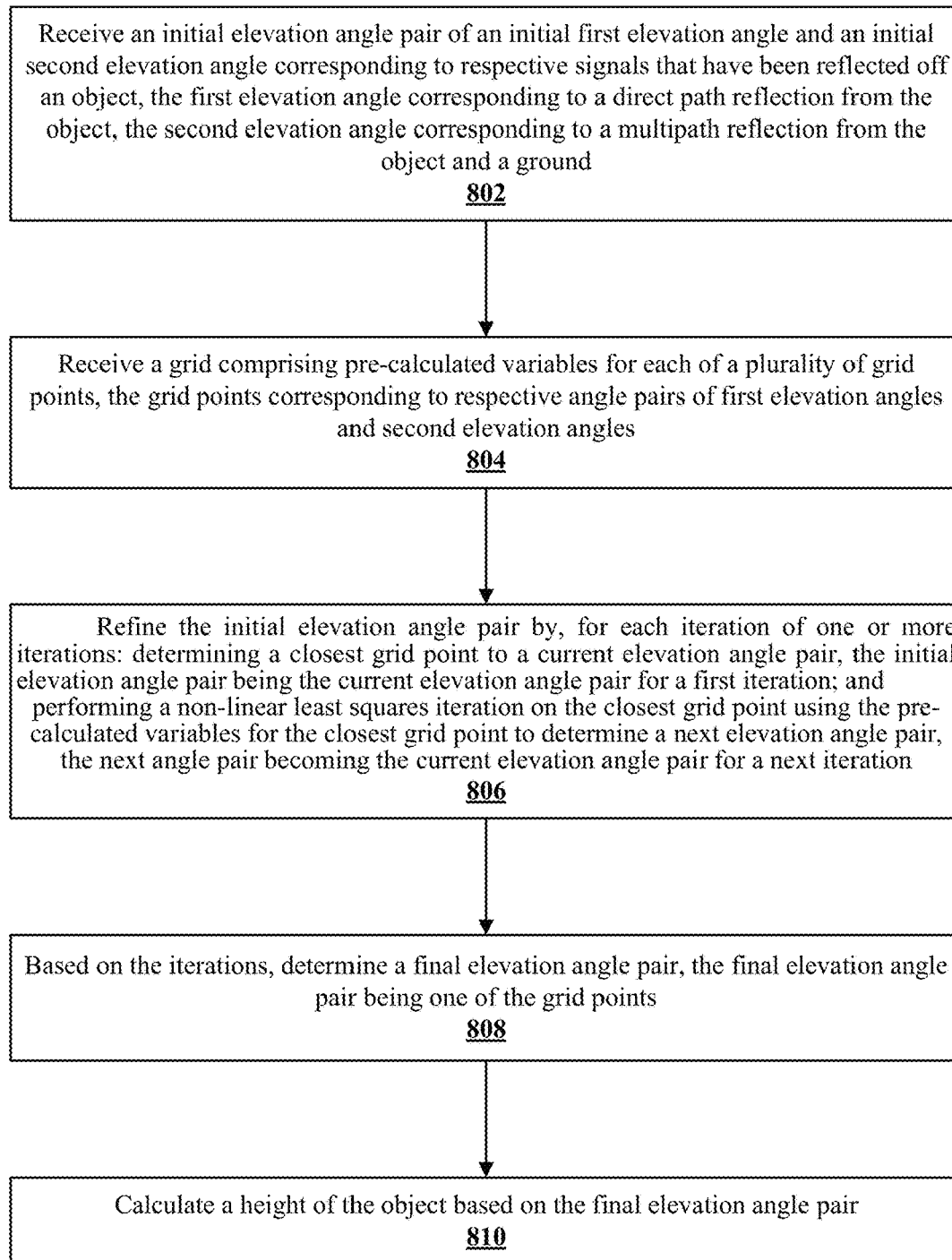
FIG. 8 illustrates, in accordance with techniques of this disclosure, an example method of NLS using a fixed grid with pre-calculated variables.

FIG. 8 is an example method 800 of NLS using a fixed grid with pre-calculated variables. The example method 800 may be implemented in any of the previously described environments, by any of the previously described systems or components, and by utilizing any of the previously described data flows, process flows, or techniques. The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At 802, an initial elevation angle pair of an initial first elevation angle and an initial second elevation angle corresponding to respective signals that have been reflected off an object are received. The first elevation angle corresponding to a direct path reflection from the object, the second elevation angle corresponding to a multipath reflection from the object and a ground. For example, the NLS module 136 may receive the initial angle pair 142 corresponding to the first signal 108 and the second signal 110. The initial angle pair 142 may be determined via any number of techniques, including those described in regard to FIGS. 1, 3, 4, and 7 as well as conventional techniques.

At 804, a grid comprising pre-calculated variables for each of a plurality of grid points is received. The grid points correspond to respective angle pairs of first elevation angles and second elevation angles. For example, the update module 502 may receive the angle grid 144 which contains the grid points 506 with associated variables 508 (e.g., calculated according to Equations 4).

At 806, the initial elevation angle pair is refined by, for each iteration of one or more iterations: determining a closest grid point to a current elevation angle pair, where the initial elevation angle pair is the current elevation angle pair for a first iteration and performing an NLS iteration on the closest grid point using the pre-calculated variables for the closest grid point to determine a next elevation angle pair. The next elevation angle pair becomes the current elevation angle pair for a next iteration. For example, the update module 502 may perform NLS iterations (e.g., using Equation 7 or 8) along grid points 506 by using respective variables 508 for the grid points to update the Hessian matrices and gradient vectors (e.g., using Equation 5 and Equation 6) starting with a grid point 506 closest to the initial angle pair 142.

At 808, based on the iterations, a final elevation angle pair is determined. The final elevation angle pair is one of the grid points. For example, the update module 502 may determine the final angle pair 504 by determining that the NLS iterations have achieved convergence. The final angle pair 504 being one of the grid points 506.

At 810, a height of the object is calculated based on the final elevation angle pair. For example, the height module 510 may calculate the target height 128 using Equation 9 or Equation 10.

Examples

Example 1a: A method comprising: receiving, via a sensor and at a first elevation angle relative to a boresight of the sensor, a first signal reflected by an object; receiving, via the sensor and at a second elevation angle relative to a boresight of the sensor, a second signal reflected by the object and a ground plane; determining a range to the object based on at least one of the first signal or the second signal; establishing a maximum height corresponding to an estimated maximum height of the object; establishing a line of second elevation angles as a function of first elevation angles, a sensor height, and the range, wherein the first elevation angles are between a first value based on the sensor height and the range and a second value based on the sensor height, the range, and the maximum height; determining an initial elevation angle pair of one of the first elevation angles and one of the second elevation angles using a search algorithm along the line; refining, using an NLS method, the initial elevation angle pair to determine the first elevation angle and the second elevation angle; and calculating a height of the object based on at least one of the first elevation angle or the second elevation angle and the sensor height.

Example 2a: The method of example 1a, further comprising performing a vehicle function based on the height of the object.

Example 3a: The method of example 2a, wherein the vehicle function comprises an advanced driver assist system or autonomous driving function.

Example 4a: The method of example 1a, wherein the function comprises a negative inverse sin of: a sin of the first elevation angle plus a ratio of twice the sensor height and the range.

Example 5a: The method of example 1a, wherein the first value comprises a negative inverse sin of a ratio of the sensor height and the range.

Example 6a: The method of example 1a, wherein the second value comprises an inverse sin of a ratio of a difference between the maximum height and the sensor height and the range.

Example 7a: The method of example 1a, further comprising determining a misalignment angle between the sensor and the ground plane, wherein: the line of second elevation angles is further a function of the misalignment angle, the first value is based further on the misalignment angle, and the second value is based further on the misalignment angle.

Example 8a: The method of example 1a, further comprising establishing a minimum height corresponding to an estimated minimum height of the object, wherein the first value is based further on the minimum height.

Example 9a: The method of example 1a, wherein the search algorithm is a greedy search algorithm.

Example 10a: The method of example 1a, wherein the maximum height is based on the range.

Example 11a: The method of example 10a, wherein the maximum height is further based on an azimuth angle of the object.

Example 12a: The method of example 1a, further comprising receiving a target list of tracked targets, wherein the maximum height is based on the target list.

Example 13a: The method of example 12a, further comprising: comparing properties of at least one of the first signal or the second signal to properties of the tracked targets in the target list; and responsive to determining that the properties of at least one of the first signal or the second signal match the properties of one of the tracked targets, determining the maximum height based on the properties of the one of the tracked targets.

Example 14a: The method of example 13a, wherein: the properties of the one of the tracked targets comprise a height of the one of the tracked targets; and the maximum height is set to the height of the one of the tracked targets.

Example 15a: A system comprising: at least one processor configured to: receive, via a sensor and at a first elevation angle relative to a boresight of the sensor, a first signal reflected by an object; receive, via the sensor and at a second elevation angle relative to the boresight of the sensor, a second signal reflected by the object and a ground plane; determine a range to the object based on at least one of the first signal or the second signal; establish a maximum height corresponding to an estimated maximum height of the object; establish a line of second elevation angles as a function of first elevation angles, a sensor height, and the range, wherein the first elevation angles are between a first value based on the sensor height and the range and a second value based on the sensor height, the range, and the maximum height; determine an initial elevation angle pair of one of the first elevation angles and one of the second elevation angles using a search algorithm along the line; refine, using an NLS method, the initial elevation angle pair to determine the first elevation angle and the second elevation angle; and calculate a height of the object based on at least one of the first elevation angle or the second elevation angle and the sensor height.

Example 16a: The system of example 15a, further comprising the sensor, wherein the sensor is a radar sensor.

Example 17a: The system of example 15a, wherein the maximum height is based on the range, an azimuth of the object, or a property in a tracked target list.

Example 18a: The system of example 15a, wherein the processor is further configured to receive or determine a misalignment angle between the sensor and the ground plane, wherein: the line of second elevation angles is further a function of the misalignment angle, the first value is further based on the misalignment angle, and the second value is further based on the misalignment angle.

Example 19a: The system of example 15a, wherein the search algorithm is a greedy search algorithm.

Example 20a: A non-transitory computer-readable storage media comprising instructions that, when executed, cause at least one processor to: receive, via a sensor and at a first elevation angle relative to a boresight of the sensor, a first signal reflected by an object; receive, via the sensor and at a second elevation angle relative to the boresight of the sensor, a second signal reflected by the object and a ground plane; determine a range to the object based on at least one of the first signal or the second signal; establish a maximum height corresponding to an estimated maximum height of the object; establish a line of second elevation angles as a function of first elevation angles, a sensor height, and the range, wherein the first elevation angles are between a first value based on the sensor height and the range and a second value based on the sensor height, the range, and the maximum height; determine an initial elevation angle pair of one of the first elevation angles and one of the second elevation angles using a search algorithm along the line; refine, using an NLS method, the initial elevation angle pair to determine the first elevation angle and the second elevation angle; and calculate a height of the object based on at least one of the first elevation angle or the second elevation angle and the sensor height.

Example 1b: A method comprising: receiving an initial elevation angle pair including an initial first elevation angle and an initial second elevation angle corresponding to respective signals from an object, the initial first elevation angle corresponding to a direct path reflection from the object, the initial second elevation angle corresponding to a multipath reflection from the object and a ground; receiving a grid comprising pre-calculated variables for each of a plurality of grid points, the grid points corresponding to respective angle pairs of possible first and second elevation angles; refining the initial elevation angle pair by: for a first iteration: determining a first closest grid point to the initial elevation angle pair; performing an NLS iteration on the first closest grid point using the pre-calculated variables for the first closest grid point to determine a second elevation angle pair; and determining a second closest grid point to the second elevation angle pair; and for each subsequent iteration of one or more subsequent iterations: performing an NLS iteration on a current grid point using the pre-calculated variables for the current grid point to determine a next elevation angle pair, the current grid point being the second closest grid point for a first subsequent iteration; and determining a subsequent closest grid point to the next elevation angle pair, the subsequent closest grid point becoming the current grid point for a next iteration; and determining, based on the iterations, a final subsequent closest grid point as a final elevation angle pair; and calculating a height of the object based on the final elevation angle pair.

Example 2b: The method of example 1b, wherein the NLS iteration uses only linear operations.

Example 3b: The method of example 1b, wherein the NLS iteration comprises calculating a Hessian matrix and a gradient vector using the pre-calculated variables and a measurement matrix corresponding to the respective signals.

Example 4b: The method of example 3b, wherein the NLS iteration further comprises using the Hessian matrix and the gradient vector to determine an offset from the closest grid point.

Example 5b: The method of example 4b, wherein the offset comprises a function of the Hessian matrix, the gradient vector, and a damping factor.

Example 6b: The method of example 5b, wherein the NLS iteration comprises a line search or a trust region function.

Example 7b: The method of example 1b, wherein the pre-calculated variables comprise four variables.

Example 8b: The method of example 7b, wherein the pre-calculated variables comprise: a first variable based on a first derivative of a steering matrix and the steering matrix; a second variable based on the steering matrix; a third variable based on the first derivative of the steering matrix and the steering matrix; a fourth variable based on the steering matrix.

Example 9b: The method of example 1b, wherein one of the pre-calculated variables comprises a pseudoinverse of a steering matrix.

Example 10b: The method of example 1b, wherein one of the pre-calculated variables comprises a product of a conjugate transpose of a first derivative of a steering matrix and a function that projects a measurement matrix onto an orthogonal complement of a column space of the steering matrix.

Example 11b: The method of example 10b, wherein another of the pre-calculated variables comprises a product of the conjugate transpose of the first derivative of the steering matrix, the function, and the first derivative of the steering matrix.

Example 12b: The method of example 1b, wherein one of the pre-calculated variables comprises an inverse of a product of a conjugate transpose of a steering matrix and the steering matrix.

Example 13b: The method of example 1b, wherein the subsequent iterations are performed until the subsequent closest grid point is the current grid point.

Example 14b: The method of example 1b, wherein the respective signals are radar signals.

Example 15b: A system comprising: at least one processor configured to: receive an initial elevation angle pair including an initial first elevation angle and an initial second elevation angle corresponding to respective signals from an object, the initial first elevation angle corresponding to a direct path reflection from the object, the initial second elevation angle corresponding to a multipath reflection from the object and a ground; receive a grid comprising pre-calculated variables for each of a plurality of grid points, the grid points corresponding to respective angle pairs of possible first and second elevation angles; refine the initial elevation angle pair by: for a first iteration: determining a first closest grid point to the initial elevation angle pair; performing an NLS iteration on the first closest grid point using the pre-calculated variables for the first closest grid point to determine a second elevation angle pair; and determining a second closest grid point to the second elevation angle pair; and for each subsequent iteration of one or more subsequent iterations: performing an NLS iteration on a current grid point using the pre-calculated variables for the current grid point to determine a next elevation angle pair, the current grid point being the second closest grid point for a first subsequent iteration; and determining a subsequent closest grid point to the next elevation angle pair, the subsequent closest grid point becoming the current grid point for a next iteration; and determine, based on the iterations, a final subsequent closest grid point as a final elevation angle pair; and calculate a height of the object based on the final elevation angle pair.

Example 16b: The system of example 15b, wherein the NLS iteration uses only linear operations.

Example 17b: The system of example 15b, wherein the NLS iteration comprises calculating a Hessian matrix and a gradient vector using the pre-calculated variables and a measurement matrix corresponding to the respective signals.

Example 18b: The system of example 15b, wherein the subsequent iterations are performed until the subsequent closest grid point is the current grid point.

Example 19b: The system of example 15b, wherein at least one of: one of the pre-calculated variables comprises a pseudoinverse of a steering matrix; one of the pre-calculated variables comprises a product of a conjugate transpose of a first derivative of the steering matrix and a function that projects a measurement matrix onto an orthogonal complement of a column space of the steering matrix; one of the pre-calculated variables comprises a product of the conjugate transpose of the first derivative of the steering matrix, the function, and the first derivative of the steering matrix; or one of the pre-calculated variables comprises an inverse of a product of the conjugate transpose of the steering matrix and the steering matrix.

Example 20b: A non-transitory computer-readable storage media comprising instructions that, when executed, cause at least one processor to: receive an initial elevation angle pair including an initial first elevation angle and an initial second elevation angle corresponding to respective signals from an object, the initial first elevation angle corresponding to a direct path reflection from the object, the initial second elevation angle corresponding to a multipath reflection from the object and a ground; receive a grid comprising pre-calculated variables for each of a plurality of grid points, the grid points corresponding to respective angle pairs of possible first and second elevation angles; refine the initial elevation angle pair by: for a first iteration: determining a first closest grid point to the initial elevation angle pair; performing an NLS iteration on the first closest grid point using the pre-calculated variables for the first closest grid point to determine a second elevation angle pair; and determining a second closest grid point to the second elevation angle pair; and for each subsequent iteration of one or more subsequent iterations: performing an NLS iteration on a current grid point using the pre-calculated variables for the current grid point to determine a next elevation angle pair, the current grid point being the second closest grid point for a first subsequent iteration; and determining a subsequent closest grid point to the next elevation angle pair, the subsequent closest grid point becoming the current grid point for a next iteration; and determine, based on the iterations, a final subsequent closest grid point as a final elevation angle pair; and calculate a height of the object based on the final elevation angle pair.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
   receiving, via a sensor and at a first elevation angle relative to a boresight of the sensor, a first signal reflected by an object;
   receiving, via the sensor and at a second elevation angle relative to the boresight of the sensor, a second signal reflected by the object and a ground plane;
   determining a range to the object based on at least one of the first signal or the second signal;
   establishing a maximum height corresponding to an estimated maximum height of the object;
   establishing a line of second elevation angles as a function of first elevation angles, a sensor height, and the range, wherein the first elevation angles are between a first value based on the sensor height and the range and a second value based on the sensor height, the range, and the maximum height;
   determining an initial elevation angle pair of one of the first elevation angles and one of the second elevation angles using a search algorithm along the line;
   refining, using a non-linear least squares method, the initial elevation angle pair to determine the first elevation angle and the second elevation angle;
   calculating a height of the object based on at least one of the first elevation angle or the second elevation angle and the sensor height; and
   performing a vehicle function based on the height of the object.

2. The method of claim 1, wherein the vehicle function comprises an advanced driver assist system or autonomous driving function.

3. The method of claim 1, wherein the function comprises a negative inverse sin of: a sin of the first elevation angle plus a ratio of twice the sensor height and the range.

4. The method of claim 1, wherein the first value comprises a negative inverse sin of a ratio of the sensor height and the range.

5. The method of claim 1, wherein the second value comprises an inverse sin of a ratio of a difference between the maximum height and the sensor height and the range.

6. The method of claim 1, further comprising determining a misalignment angle between the sensor and the ground plane, wherein:
the line of second elevation angles is further a function of the misalignment angle,
the first value is based further on the misalignment angle, and
the second value is based further on the misalignment angle.

7. The method of claim 1, further comprising establishing a minimum height corresponding to an estimated minimum height of the object, wherein the first value is based further on the minimum height.

8. The method of claim 1, wherein the search algorithm is a greedy search algorithm.

9. The method of claim 1, wherein the maximum height is based on the range.

10. The method of claim 9, wherein the maximum height is further based on an azimuth angle of the object.

11. The method of claim 1, further comprising receiving a target list of tracked targets, wherein the maximum height is based on the target list.

12. The method of claim 11, further comprising:
comparing properties of at least one of the first signal or the second signal to properties of the tracked targets in the target list; and
responsive to determining that the properties of at least one of the first signal or the second signal match the properties of one of the tracked targets, determining the maximum height based on the properties of the one of the tracked targets.

13. The method of claim 12, wherein:
the properties of the one of the tracked targets comprise a height of the one of the tracked targets; and
the maximum height is set to the height of the one of the tracked targets.

14. A system comprising:
at least one processor configured to:
receive, via a sensor and at a first elevation angle relative to a boresight of the sensor, a first signal reflected by an object;
receive, via the sensor and at a second elevation angle relative to the boresight of the sensor, a second signal reflected by the object and a ground plane;
determine a range to the object based on at least one of the first signal or the second signal;
establish a maximum height corresponding to an estimated maximum height of the object;
establish a line of second elevation angles as a function of first elevation angles, a sensor height, and the range, wherein the first elevation angles are between a first value based on the sensor height and the range and a second value based on the sensor height, the range, and the maximum height;
determine an initial elevation angle pair of one of the first elevation angles and one of the second elevation angles using a search algorithm along the line;
refine, using a non-linear least squares method, the initial elevation angle pair to determine the first elevation angle and the second elevation angle;
calculate a height of the object based on at least one of the first elevation angle or the second elevation angle and the sensor height; and
perform a vehicle function based on the height of the object.

15. The system of claim 14, further comprising the sensor, wherein the sensor is a radar sensor.

16. The system of claim 14, wherein the maximum height is based on the range, an azimuth of the object, or a property in a tracked target list.

17. The system of claim 14, wherein the processor is further configured to receive or determine a misalignment angle between the sensor and the ground plane, wherein:
the line of second elevation angles is further a function of the misalignment angle,
the first value is further based on the misalignment angle, and
the second value is further based on the misalignment angle.

18. The system of claim 14, wherein the search algorithm is a greedy search algorithm.

19. A non-transitory computer-readable storage media comprising instructions that, when executed, cause at least one processor to:
receive, via a sensor and at a first elevation angle relative to a boresight of the sensor, a first signal reflected by an object;
receive, via the sensor and at a second elevation angle relative to the boresight of the sensor, a second signal reflected by the object and a ground plane;
determine a range to the object based on at least one of the first signal or the second signal;
establish a maximum height corresponding to an estimated maximum height of the object;
establish a line of second elevation angles as a function of first elevation angles, a sensor height, and the range, wherein the first elevation angles are between a first value based on the sensor height and the range and a second value based on the sensor height, the range, and the maximum height;
determine an initial elevation angle pair of one of the first elevation angles and one of the second elevation angles using a search algorithm along the line;
refine, using a non-linear least squares method, the initial elevation angle pair to determine the first elevation angle and the second elevation angle;
calculate a height of the object based on at least one of the first elevation angle or the second elevation angle and the sensor height; and
perform a vehicle function based on the height of the object.

* * * * *